UNITED STATES PATENT OFFICE.

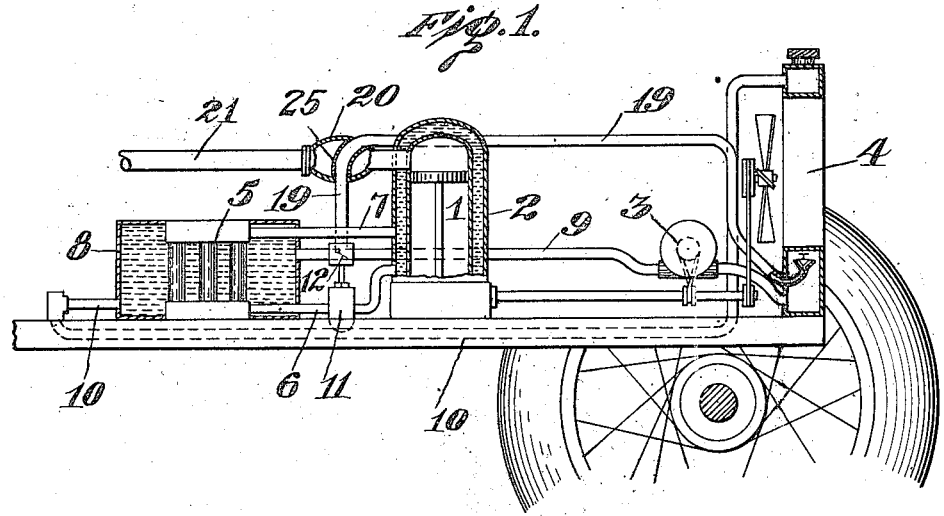
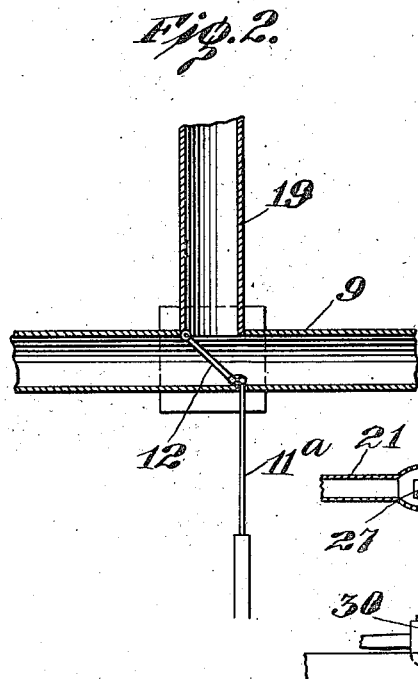
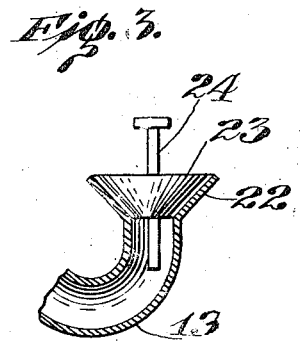
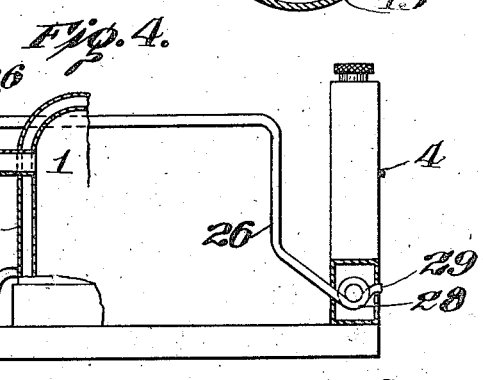

LEON CAMMEN, OF NEW YORK, N. Y.

THERMOSTATIC CONTROL MEANS FOR MOTORS.

1,303,768.  Specification of Letters Patent.  Patented May 13, 1919.

Original application filed January 21, 1918, Serial No. 213,109. Divided and this application filed July 1, 1918. Serial No. 242,877.

*To all whom it may concern:*

Be it known that I, LEON CAMMEN, citizen of the United States, and resident of the borough of Manhattan, in the city, county, and State of New York, have invented certain new and useful Improvements in Thermostatic Control Means for Motors, of which the following is a specification.

This invention, which is a division of my application Serial No. 213,109, relates to internal combustion motors, and it comprises certain temperature controlled means, whereby the water in the radiator, when cut off from circulation through the engine jacket, is subjected to heat from the engine exhaust gases, to thereby protect the radiator water from excessive cooling and possible freezing.

The temperature control means which I employ for heating the radiator water, may function through the medium of a thermostatic valve, which itself is actuated by a variation in temperature of the jacket water.

Other features and advantages of my said invention will hereinafter appear.

Figure 1 is a side elevation of a power plant embodying my thermostatic control means as applied to the radiator water.

Fig. 2 is a detail of the valve in the by-pass.

Fig. 3 is a detail of the gravity valve in the radiator, and

Fig. 4 is a detail of a modification.

The motor layout herein indicated is intended for use either with a road vehicle or with aircraft, and includes the motor cylinder 1, water jacket 2 therefor, pump 3, and radiator 4. For convenience I have illustrated herewith the double circulating system found in my Patent No. 1,256,109 wherein a radiator 5 is included, by pipes 6, 7, in a closed circuit with jacket 2; and a casing 8 incloses said radiator 5, which casing, by pipes 9, 10, is included in circuit with the air cooled radiator 4.

Assuming that water passes from jacket 2 through pipe 6 to radiator 5, and returns through pipe 7, then a thermostatic device 11 is located in pipe 6, to be influenced by the temperature thereof, and to control a valve 12 in pipe 9, whereby increase of temperature in pipe 6, representing excessive heat in the jacket 2, will cause the thermostatic device 11, by stem 11ª, to open the valve 12, thus permitting water to flow between the casing and radiator 4. It should be understood that while the jacket temperature is not excessive, the valve 12 will remain closed, because the thermostatic device 11 will not be actuated to open said valve, and that when the valve 12 is closed the water of the closed circuit system will not be subjected to the cooling influence of the water from radiator 4.

In devising means for the application of heat to the radiator water, when, for example, as in the system indicated, the flow of cooling water from the air cooled radiator is checked during the operation of the motor, and it is desirable to prevent the radiator water from cooling unduly or freezing, I may, for example, provide a return duct which I call a by-pass, as a pipe 19, so arranged between the pipe 9 and radiator 4 as to return to the radiator the water flowing therefrom without allowing it to enter the casing 8. This pipe 19 may have a jacket, as at 20, which is included in the exhaust pipe 21, and furnishes heat to the water passing through said pipe 19, so that water thus flowing to the radiator will serve to at least maintain a moderate temperature in the radiator while the radiator is cut off from the influence of the engine heat.

The terminal of pipe 19 within the radiator may have a valve seat 22, to receive a valve 23, having stem 24; the purpose of said valve being to normally provide means, through the weight of water upon said valve, to prevent the flow of water from the radiator into pipe 19 when the by-pass is closed and the radiator water is to circulate through the casing 8; but when the valve 12 is actuated to open the by-pass, and to close the path to casing 8, then the valve 23 will open under the influence of any steam pressure that may be generated in pipe 19.

The by-pass pipe 19, where jacketed by the exhaust, may be provided with a removable covering 25, as of asbestos, to protect said pipe from injury when, as in summer, its service is not required.

In the modification of my invention illustrated in Fig. 4, I have shown a by-pass pipe 26, between the engine exhaust pipe 21 and radiator 4. A valve 27 in the exhaust pipe serves to deflect a portion of the hot exhaust gases to by-pass pipe 26, to be conducted thereby to the interior of the radiator, to moderately heat the water therein. As shown, the by-pass pipe 26 takes the form, within the radiator, of a heating coil 28, whose terminal 29 extends outside the radiator, to discharge the heated products to the atmosphere.

Obviously the by-pass pipe 26 and heating coil 28 are intended for use, in some instances, instead of the by-pass pipe 19. The valve 27, which controls the admission of a portion of the exhaust gases from exhaust pipe 21 to by-pass pipe 26, may be actuated by a thermostatic device 30, which may be influenced through the motor temperature in the same manner as the valve 12 and thermostatic device 11.

Variations may be resorted to within the spirit and scope of my said invention and parts thereof used without others.

I claim:—

1. The combination with an internal combustion motor having a circulatory cooling system including a radiator, of an alternate return duct in communication with said radiator, means for heating said return duct, means to direct fluid flow from said radiator either into cooling relation with said motor or to divert said fluid flow to said return duct, and means controlled by the temperature of said motor to actuate said flow directing and diverting means.

2. The combination with an internal combustion motor having a circulatory cooling system including a radiator, of an alternate return duct in communication with said radiator, means for heating said return duct, and thermostatic means controlled by the motor temperature to direct the fluid flow from said radiator either into cooling relation with said motor or to divert said fluid flow to said return duct.

3. The combination with an internal combustion motor having a circulatory cooling system including a pump and a radiator, of an alternate return duct in communication with said radiator, heating means for said return duct, said duct terminating within said radiator in an upturned valve seat, a gravity valve therein, normally held closed by fluid weight, and thermostatic means controlled by the motor temperature to direct the fluid flow from said radiator either into cooling relation with said motor or to divert said fluid flow back to said radiator through said return duct.

Signed at the borough of Manhattan in the city, county and State of New York this 29th day of June, A. D. 1918.

LEON CAMMEN.

Witnesses:
F. W. BARKER,
A. B. BARKER.